No. 854,815. PATENTED MAY 28, 1907.
M. V. B. ETHRIDGE.
POSTMARKING AND CANCELING MACHINE.
APPLICATION FILED JUNE 9, 1905.

6 SHEETS—SHEET 1.

Attest:
Herman Meyer
Alan McDonnell.

Inventor:
Martin V. B. Ethridge
by William R. Baird
his Atty

No. 854,815. PATENTED MAY 28, 1907.
M. V. B. ETHRIDGE.
POSTMARKING AND CANCELING MACHINE.
APPLICATION FILED JUNE 9, 1905.
6 SHEETS—SHEET 2.
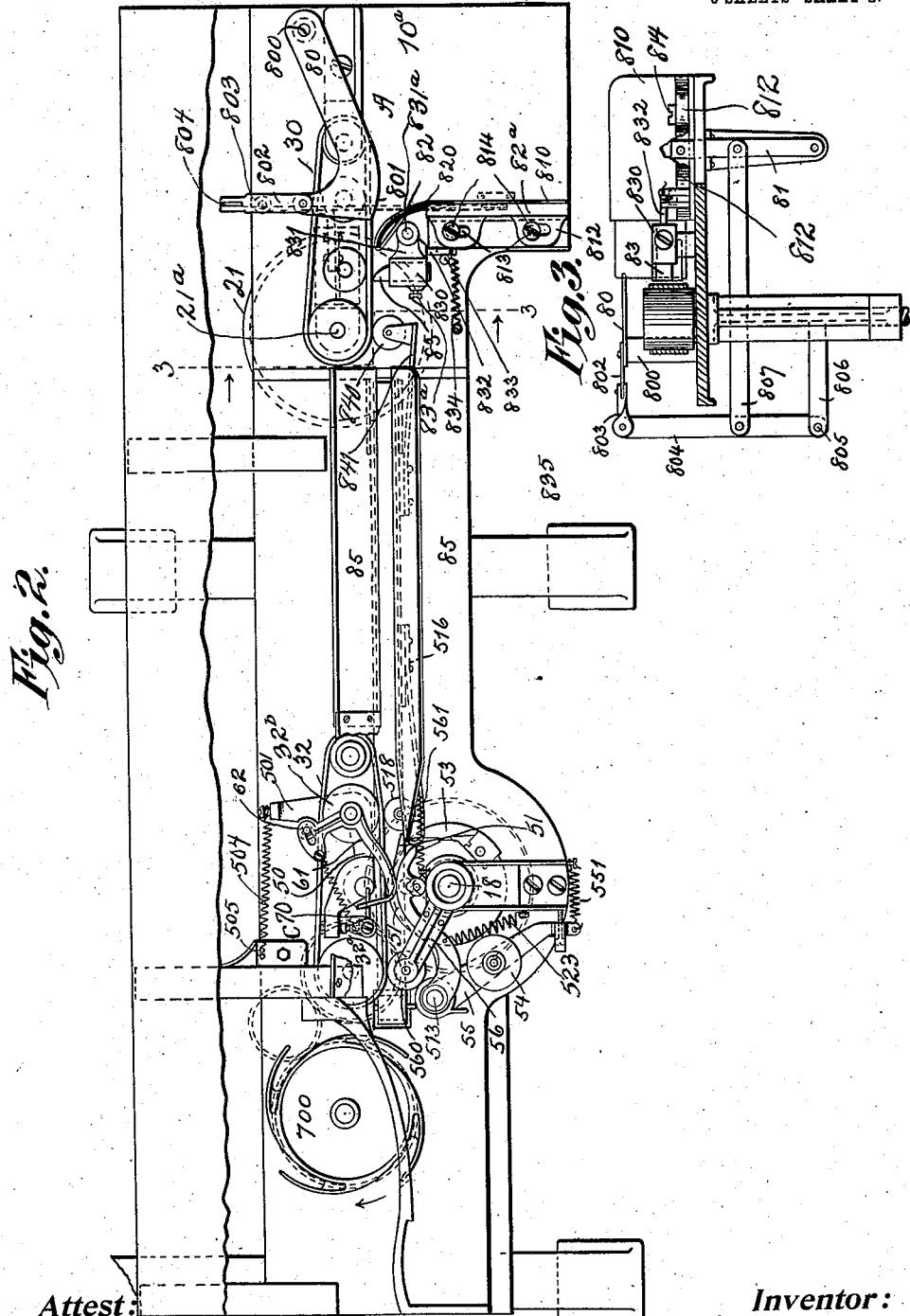
Attest:
Herman Meyer
Alan McDonnell
Inventor:
Martin V. B. Ethridge
by William R. Baird
his Atty

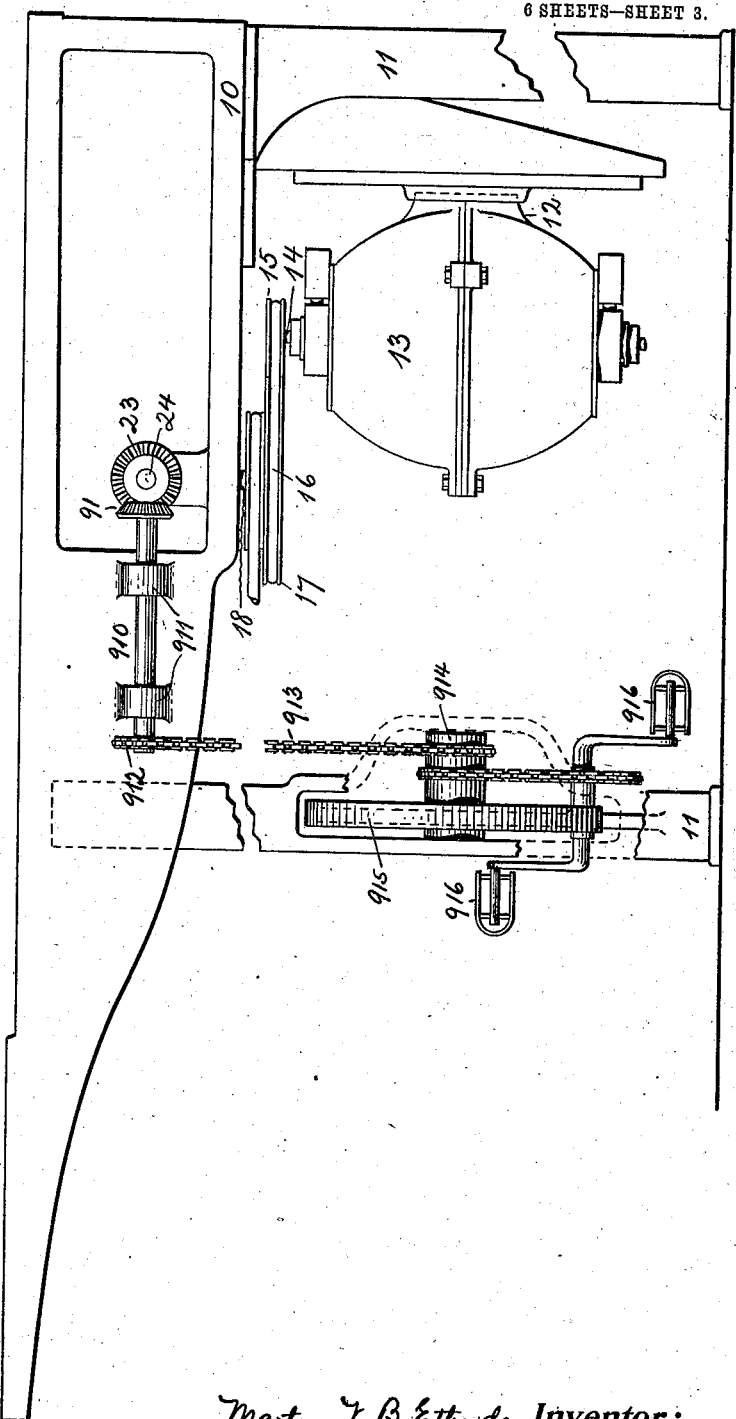

No. 854,815. PATENTED MAY 28, 1907.
M. V. B. ETHRIDGE.
POSTMARKING AND CANCELING MACHINE.
APPLICATION FILED JUNE 9, 1905.

6 SHEETS—SHEET 4.

Attest:
Herman Meyer
Alan McDonnell

Inventor:
Martin V. B. Ethridge
by William R. Baird
his Atty

No. 854,815. PATENTED MAY 28, 1907.
M. V. B. ETHRIDGE.
POSTMARKING AND CANCELING MACHINE.
APPLICATION FILED JUNE 9, 1905.
6 SHEETS—SHEET 5.
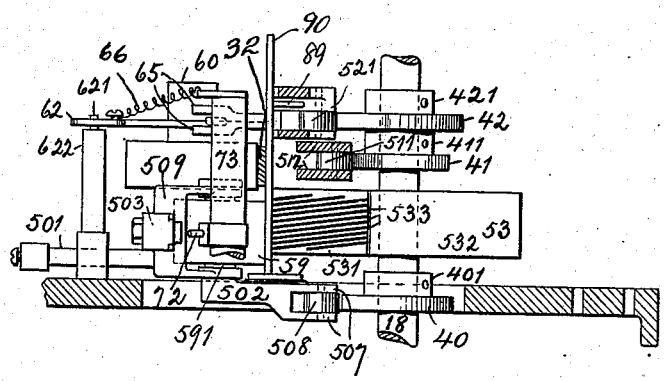
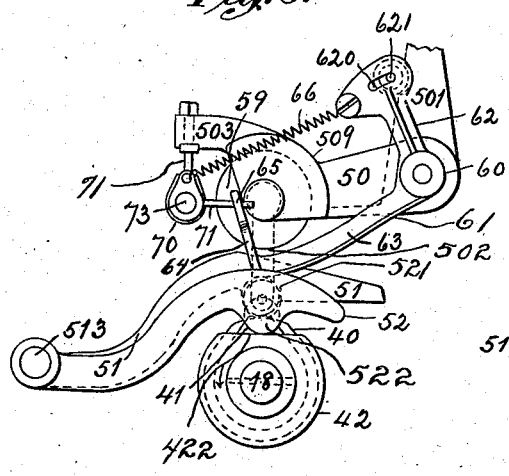
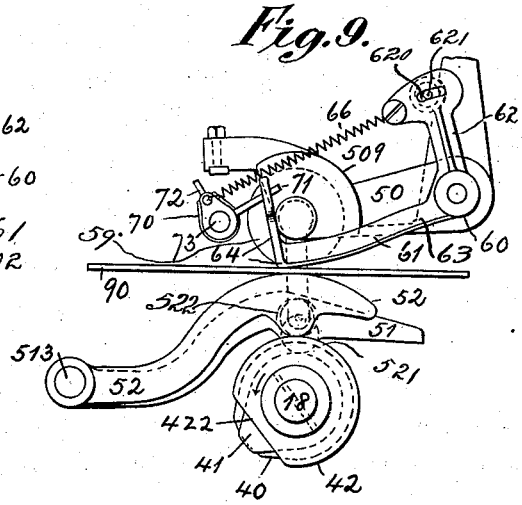
Attest:
Herman Meyer
Alan McDonnell
Martin V. B. Ethridge Inventor:
by William R. Baird
his Atty No. 854,815. PATENTED MAY 28, 1907.
M. V. B. ETHRIDGE.
POSTMARKING AND CANCELING MACHINE.
APPLICATION FILED JUNE 9, 1905.

6 SHEETS—SHEET 6.

Attest:
Herman Meyer
Alan McDonnell

Martin V. B. Ethridge Inventor:
by William R. Baird
his Atty

UNITED STATES PATENT OFFICE.

MARTIN V. B. ETHRIDGE, OF NEW YORK, N. Y.

POSTMARKING AND CANCELING MACHINE.

No. 854,815.  Specification of Letters Patent.  Patented May 28, 1907.

Application filed June 9, 1905. Serial No. 264,413.

*To all whom it may concern:*

Be it known that I, MARTIN V. B. ETHRIDGE, a citizen of the United States, residing at New York, in the county of New York and State of New York, have invented certain new and useful Improvements in Postmarking and Canceling Machines, of which the following is a specification.

My invention relates to postmarking and canceling machines and its novelty consists in the construction and adaptation of the parts as will be more fully hereinafter pointed out.

The objects of my invention are to provide a machine of this character of a simple economical construction, one which may be fed by hand and operated by foot power or operated by a motor and fed automatically, and one in which the postmarking takes place at a predetermined point only.

Figure 1:
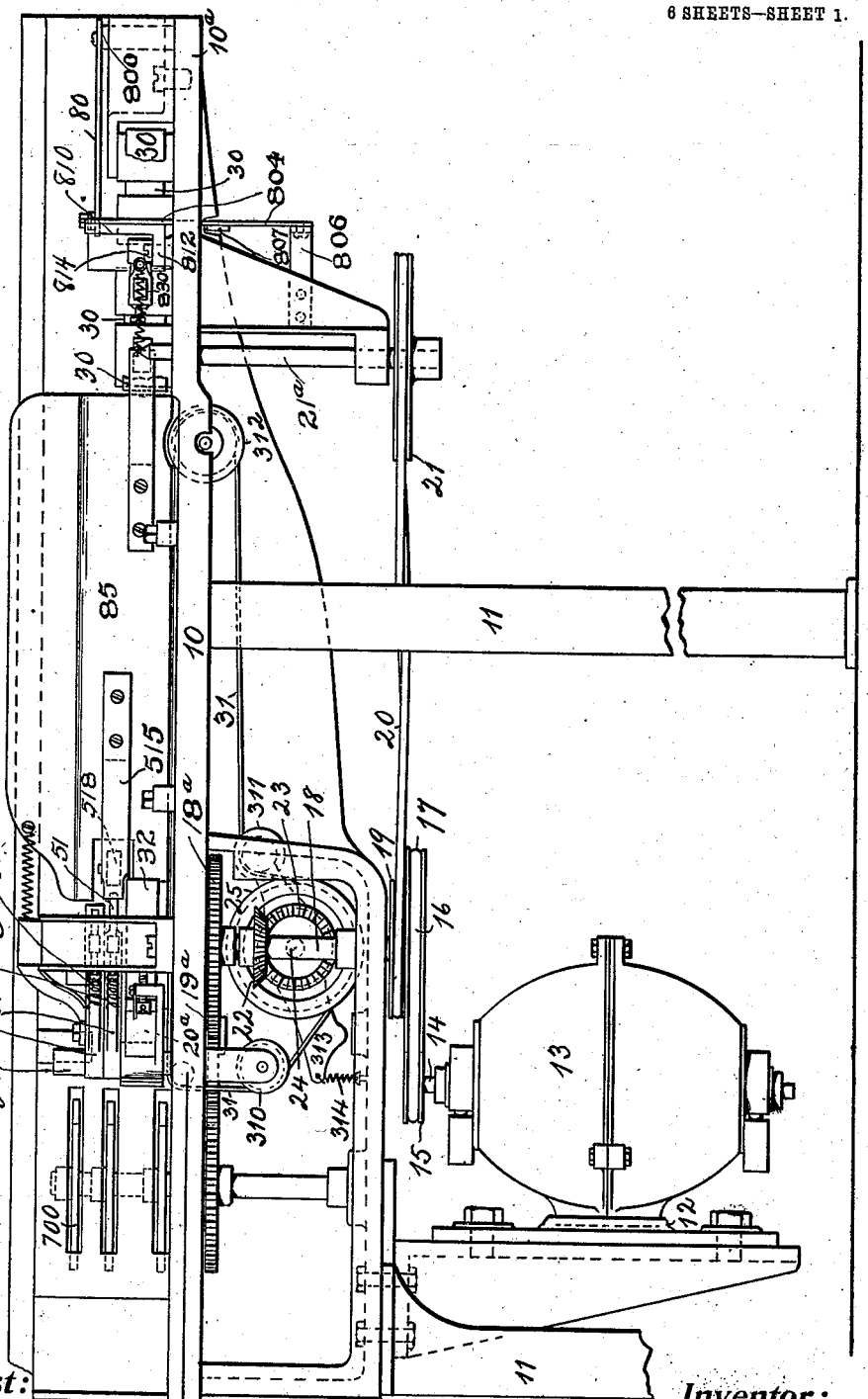
Figure 5:
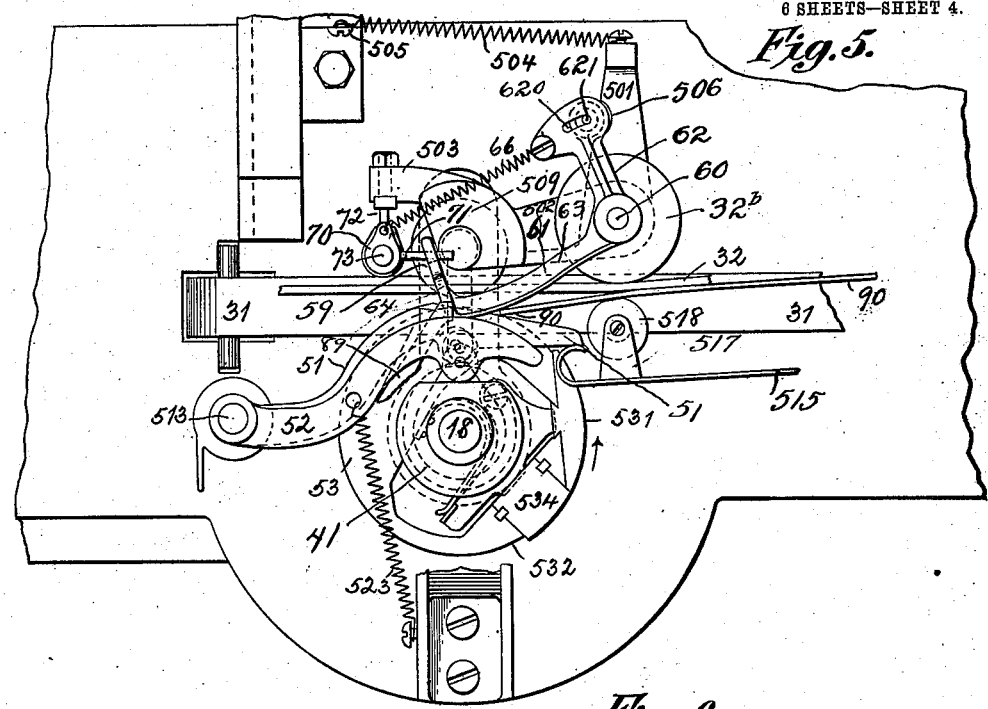
Figure 6:
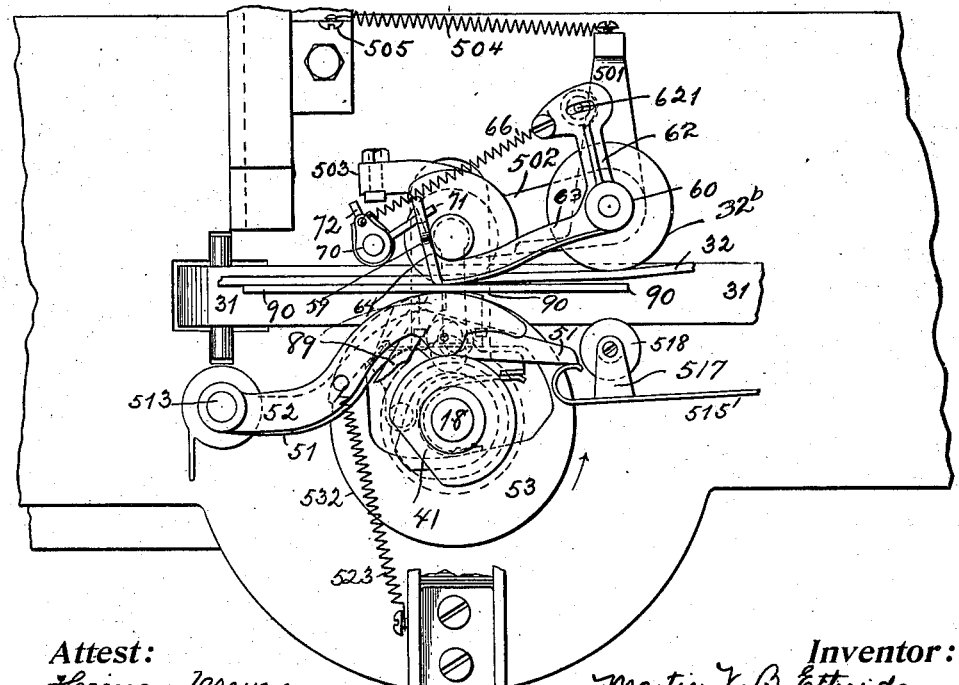
Figure 10:
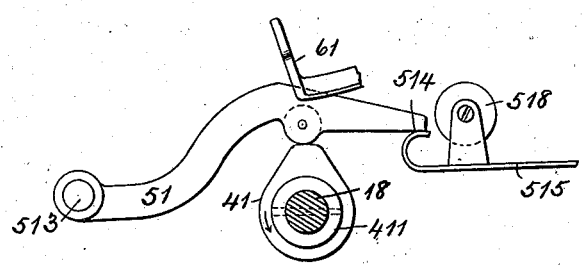
Figure 11:
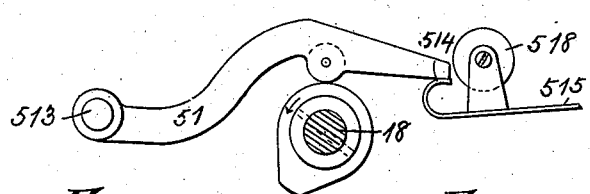
Figure 12:
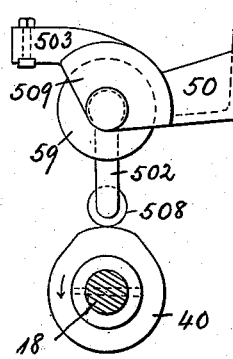
Figure 13:
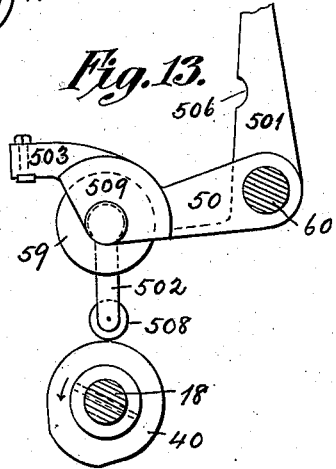

In the drawings, Figure 1 is a front elevation of the machine condensed at the bottom to bring the same within the limits of one sheet, Fig. 2 is a top plan view of the same. Fig. 3 is a vertical section on the plane of the line 3—3 in Fig. 2 looking from left to right. Fig. 4 is a rear elevation of the driving gear of the machine illustrating the alternative use of motor and foot power. Fig. 5 is an enlarged top plan view of the impression roll and printing cylinder with a letter about to be fed thereto. Fig. 6 is a view similar to Fig. 5 with a letter between the impression roll and printing cylinder. Fig. 7 is a vertical section on the plane of the line 7—7 in Fig. 6. Fig. 8 is a top plan view of the upper portion of the mechanism shown in Fig. 5 and Fig. 9 is a similar view of the mechanism shown in Fig. 6. Figs. 10, 11, 12 and 13 are top plan views of separate and co-operative portions of the mechanism.

The mechanism of this machine is mounted upon a frame of appropriate construction, the one shown comprising a suitable table 10 and supporting legs 11 therefor.

The conveying mechanism preferably comprises a plurality of traveling means 30, 31 and 32 which deliver the mail matter one to another, the first of said means (30) in the order of operation, being arranged at the separating station A and constituting a part of the separating and feeding mechanism and delivering the separated letters to the second of said traveling means, 31, which constitutes the main conveyer and carries the mail matter to the third conveyer, 32, and also carries the mail matter while the same is undergoing the operations, at the station C, of and connected with the impression of the postmarking and stamp canceling imprints thereon, being assisted by the aforesaid third conveyer 32 in holding the mail matter during the operations at said station C. A most advantageous relative arrangement of said traveling means, each of which preferably comprises a belt, is shown in Figs. 1 and 2, wherein it will be seen that the belt 30 travels in a horizontal path above the receiving end or platform $10^a$ of the separating and feeding mechanism, but has its face arranged upright or vertically while the belt 31 travels in a horizontal path with its face horizontal and its upper run on a level slightly below or approximately on a level with the upper surface of said platform $10^a$ or lower edge of the belt 30. The belt 32 also is an upright one, and traverses a fixed horizontal path arranged above the upper run of the end of the belt 31 which is remote from the belt 30. Arranged above the belt or conveyer 31 are two properly-spaced sloping, guide rails 85 for the mail. The belt 32 is provided with suitable pulleys, of which one, $32^a$, constitutes the driving pulley thereof and another of which ($32^b$) is preferably arranged intermediate of the ends of the belt and opposite the deflecting or guiding roller 518, hereinafter described.

A suitable operating means for the several belts referred to is as follows:—Suspended from a bracket 12 beneath the table 10 is a motor case 13 containing a motor (not shown), the shaft 14 of which motor supports a pulley 15 which, by means of a belt 16, is connected with a second pulley 17, fixed on a shaft 18, to which shaft 18 there is secured another pulley 19 which is provided with a belt 20 which drives a pulley 21, which is fixed on the driving shaft $21^a$ of the belt 30. On the shaft 18 there is secured a horizontal bevel gear 22 which meshes with a vertical gear 23, to the shaft 24 of which there is secured a pulley 25 which serves to actuate the horizontal, or main belt 31. This belt 31 runs over idlers 310, 311 and 312, the first and last of which are mounted in fixed bearings on the frame of the machine: while the intermediate one, 311, is movably pressed against the belt to take up slack therein, being mounted on one end of a lever 313, the other end of which is provided with a coiled spring 314 which holds said roller yieldingly and constantly against the belt and keeps the same taut. The shaft 18, is also provided with a gear 18ª which meshes with a pinion 19ª which is mounted on the shaft 20ª of the driving pulley 32ª of the belt 32, whereby this belt also is driven from said shaft 18.

At the station A there is mounted a separating mechanism which acts automatically, in conjunction with the belt 30, to feed the letters one at a time to the main belt 31, said separating mechanism serving to prevent the passage of more than one letter at a time. The particular construction of said mechanism is not essential to the present invention. The one shown is illustrated for the reason that it most satisfactorily accomplishes the result sought, but it is not claimed herein, as it forms the subject matter of a copending application filed by me June 1, 1905, and numbered, serially, 263,237. It comprises a primary separator and a secondary separator, which primary separator is intended to permit only one piece of mail matter to pass at one time while the secondary separator supplements the primary one and in the event of the passage of two pieces at once, catches and holds one of the same until the other has passed. These primary and secondary separators are arranged in the path of the letters being conveyed by the belt 30, and the primary separator, is provided with a retarding sheet of material, such as emery cloth, which will impose considerable friction upon the mail. This retarding sheet is carried by a movably mounted carrier or frame 82ª which is provided with operating means of such character that the operation of feeding the mail matter to the belt 30, will cause the retarding sheet to move toward the vertical plane of said belt and permit, as stated, only one letter to pass at a time. The means for moving said carrier, comprise an angle lever 80, which is fulcrumed at one end upon an upright 800 secured to the frame of the machine. Its face 801, at the junction of its two members is normally in the pathway of the letters bunched to be fed into the machine and its member remote from its pivot extends transversely of the frame of the machine and is reduced in thickness and pivotally connected with a link 802 which is pivoted to a second link 803 which is also pivoted to an upright lever 804. This upright lever is fulcrumed at 805 to a bracket 806 secured below the table, and, by means of a horizontal link 807, it is connected with an upright lever 81, the upper end of which is pivotally connected with the frame 82ª which carries said emery cloth. Thus, pressure imposed on the face 801 of the lever 80 will be transmitted to the frame 82ª, whereby the latter and the emery cloth will be advanced toward the belt 30. The frame 82ª comprises an upright portion 810 which extends transversely of the frame of the machine and is suitably formed to provide a space adapted to receive the end of the retarding cloth. The upright portion 810 of the frame also constitutes a partition or upright screen which divides the receiving end 10ª of the table or main frame into a stacking space within which the mail may be dumped without falling over into the other part of the frame where it would interfere with the separating mechanism. The other member, 812, of the frame 82ª, constitutes, so to speak, a laterally expanded base or shoe therefor, and is provided with slots 813 through which extend securing pins 814, which also coöperate with said slots in guiding the frame in its movements toward and from the belt 30.

The retarding sheet 82 is an emery cloth infolded on itself and having its ends suitably held in the space in that portion 810 of the frame 82ª from which its folded portion projects, and it has requisite stiffness imparted to it by means of a strip 820 of thin flexible metal, which it incloses.

The secondary separator consists of one, or more, blocks 83, of material, such as emery cloth, adapted frictionally to retard the motion of a letter engaged with it. This block 83 is mounted in a holder 830 which is yieldably held toward the belt 30, this holder in the form herein shown and preferred, being secured on the end of an angle lever 831 which is fulcrumed at 831ª and comprises an arm 832 to which is secured the spring 834. The movement of the angle lever 831, and consequently of the block toward the belt 30, is limited by a stop 833. The face of the block 83 is beveled toward the mail so that a single piece can pass the same, and the block is adjustably secured in its holder by a set screw 83ª, or other suitable means, whereby it may be set at any predetermined distance from the belt and may also be adjusted to compensate for wear. The block or blocks 83 are set closer to the belt than is the retarding cloth 82 of the primary separator.

A roller 840 is arranged at the exit of the separating station and is yieldably pressed toward the face of the belt 30, preferably by mounting it upon one end of a spring arm 841, the other end of which arm is suitably secured to the frame of the machine. This roller serves to press the letter against the belt 30, yielding at the same time to the thickness of said letter and assures the movement of the letter with the belt 30 and its proper guidance and delivery to the space between the guide rails 85 and the main belt 31.

At the entrance of the printing station C there is arranged a roller 518 which is movable toward and from the belt 32 and is adapted normally to press the letter or other piece of mail matter against the same. This roller forms an element of a means by which the letter is deflected and guided accurately to the action of the timing and printing means hereinafter set forth in detail, and it is preferably arranged opposite the pulley 32ᵇ hereinbefore mentioned, which is adapted to form an abutment to its action. Its bearings are preferably mounted in a bracket 517 carried by an arm 515 which holds it normally in position to engage the letter, for which purpose it is preferred to make the arm of material having inherent elasticity and to secure its end remote from the roller, as at 516 (Fig. 2), to a suitable part of the frame of the machine.

Means are provided to move the roller 518 in opposition to the spring of its arm, which means advantageously comprise a lever 51, fulcrumed upon a post 513, secured to the frame of the machine, and provided between its ends with a roller 511 which engages a cam 41 fixed to the shaft 18. The free extremity of the lever 51 engages the end of the arm 515. A spring 519 is attached to the lever 51 and keeps its roller 511 in engagement with the cam 41. It will thus be apparent that when the higher part of the cam 41 acts upon the lever 51 it will press the lever toward the belt 32 and into the path of the advancing letter, the roller 518 at the same time following said movement of the lever and engaging the letter. The continued rotation of the cam 41 brings its lower part into engagement with the lever, so that the spring 519 becomes operative to cause it to recede from the belt 32 and in its receding movement it presses upon the free end of the arm 515 and forces the roller 518 back from the belt 32, thus releasing its pressure on the letter.

The printing, or postmarking and canceling cylinder 53 is arranged below the cam 41 and between the horizontal planes of the belts 31 and 32 and is fixed on the before mentioned shaft 18. It is provided (as shown best in Fig. 5) with a sector 531 which has a greater radius than the remaining sector 532 of its periphery. On this sector 531 there is embossed the canceling rules 533 (see Fig. 7) and this sector (531) is also provided with a removable portion 534 which carries the postmarking type.

59 designates the impression roller. This impression roller is mounted upon a swinging bearing and is preferably made of rubber. It is entirely free from contact with the belts and forms no part of the operating means therefor. The movement of the impression roller with relation to the printing cylinder 53 is so controlled that said roller presses the letter against the latter only when the printing elements on the cylinder are in position to engage the letter, by an advantageous means now to be described. Its swinging bearing comprises a lever 50 which is pivoted at one end on an upright rod 60 which is secured to the frame of the machine. This lever is provided with an arm 501, which arm extends from the pivoted end of the lever at a suitable angle therewith and is connected with a spring 504 (Figs. 5 and 6) by which the lever and the impression roller are yieldably held toward the printing cylinder, the end of the spring remote from the arm 501 being suitably secured, as at 505, to the frame of the machine (see Fig. 2). The end of the lever remote from the pivot rod 60 is provided with a second arm (502), which is arranged in a plane lower than that of the arm 501 (Fig. 7) and projects from the lever in a direction opposite that of the arm 501, and is engaged by an actuating cam 40, which is fixed on the shaft 18 before mentioned and is located below the printing cylinder 53 and acts to force the lever 50 and the impression roller away from the printing cylinder at a predetermined time. This second arm 502 is preferably forked, at 507, to provide bearings for a horizontal roller 508 which is preferably employed to engage the cam and assure proper operation with a minimum of friction. A recessed segment, or yoke, 509 is mounted on side lever 50 and projects upward therefrom, and within the same and upon a shaft 591 there is mounted the impression roller 59 aforesaid. The tendency of the spring 504 is to hold the impression roller 59 toward the printing roller, but this tendency is resisted until a predetermined moment by means of a stop mechanism, which engages a third arm 503 which extends laterally from the yoke or recessed segment 509.

The stop mechanism just referred to comprises a lever 70, having an upper arm or member 71, a lower arm or member 72 and a vertical member 73, which vertical member unites the other members and is suitably mounted to turn axially, as upon a foot (not shown) secured in a proper shoe (not shown) in the frame of the machine. The arms 71 and 72 of the lever 70 are arranged at an angle with each other and the arm 72 is adapted to be moved into the path of movement of the arm 503 of the lever 50, (see Fig. 5) and when so moved it serves to prevent movement of this lever in the direction which carries the impression roller toward the printing cylinder.

The lever 70 is actuated to move its arm 72 out of engagement with the arm 503 (see Fig. 6) by a device which preferably comprises a bent or bell crank lever 61, preferably having three arms and fulcrumed, at the junction of its main arm 63 and one of its laterally extending end-arms or members 62, upon the rod 60, to which rod as hereinbefore stated, the lever 50 also is pivoted. The other end member or arm (64) of said lever projects into the path of, and is forked to receive, the arm 71 of the lever 70. The first mentioned end-member or arm 62, of the lever 61 preferably has a laterally-expanded extremity and is provided with an elongated slot 620 into which extends the end 621 of a guide post 622 which projects from the machine frame. A spring 66 extends from the end of the member 62 of the lever 61 to the lever 70. It will thus be seen that when force is imposed upon the edge of the member or arm 63 which is presented to the path of the letter 90, this member, or arm, will turn pivotally upon the axis 60, forcing its end or the member 64 in the same direction and causing the latter to press upon the arm 71 of the lever 70 and move the other arm (72) of the lever out of engagement with the arm 503 of the lever 50 which carries the impression roller, thus removing the force which restrained the movement of said roller toward the printing cylinder. While this is being accomplished the arm 62 of the three-armed lever is, of course, moving in the direction of the arrow (Fig. 5,) opposite to that of the arm 72, whereby the spring 66 is put under strong tension, so that when the force which causes such movement is removed, this spring will operate to pull the arms 64 and 71 toward each other, thus restoring the previous relation of the parts, the impression roller meanwhile having been restored to its former position by the action of the cam 40 on the lever 50.

In order that the lever 50 will not interfere with the movement of the three-armed lever thereon, the edge of the arm 501 of the former lever is cut away contiguous to the edge of the arm 62 as shown at 506.

The force which causes or controls the movement of the lever 61 advantageously comprises a cam 42 which is mounted upon the shaft (18) which carries the other cams before mentioned and is cut off at 422 by the chord of the missing arc. This cam actuates a lever 52 which is held against the same by a spring 523 and is provided between its ends with a roller 521 which is mounted between forks 522 with which the lever is provided.

Upon reference to Fig. 5, it will be seen that in one position of the relative movements of the levers 61 and 51, that is to say, in that position assumed by these levers when a letter is approaching the same, they extend toward each other across the path of movement of the letter and from opposite sides of its path. They thus interpose a barrier or temporary stop to the movement of the letter to the position in which it receives the postmarking and canceling imprints. In this position of the parts named, the roller 518 is also in position to grip the letter.

89 designates a fixed stop which is of any suitable construction and is supported in front of the marking cylinder 53 in any suitable manner, and projects into the path toward which the letter has been deflected. It serves to hold the letter until the marking portion of the cylinder 53 is in position to act. As here shown, it is in the form of an arm (shown broken off in Figs. 5 and 6) which is suitably supported and projects horizontally through an opening in the lever 52 and with its free end immediately rearward of the plane of the portions of the arm 63 and lever 52 when the two latter are in their relative positions of movement whereby they form a notch or notch-shaped space $90^\times$ and are adapted to bar the progress of the letter to the stop 89, as hereinafter more fully stated.

The normal positions of the several parts thus far described, that is to say, the positions assumed by the same when not engaged with a letter or other piece of mail matter which is to be postmarked and stamp canceled, are as follows:—The lever 51 is on the high part of the cam 41 and forms with the arm 63 of the lever 61, the notch-shaped space $90^\times$ just referred to, and the arm 63 extends across the letter path from the side of the belt 32 opposite the roller 518 and to a place rearward of said roller. The lever 51 being on the high part of the cam 41, the roller 518 will be in its extreme position toward the belt 32 and thus is adapted to press the letter against the belt at the place opposite the roller $32^b$. The lever 52 which actuates the lever 61 is on the low part of its cam 42; the arm 503 of the swinging bearing 50 which carries the impression roller 59 is engaged with the member 72 of the holding or restraining device and the arm 502 of said lever or bearing is on the high part of the cam 40, the impression roller being thus held away from the plane of the marking cylinder 53.

In the operation of the machine:—The letters are stacked in a bunch with their lowermost edges resting on the table 10. The bunch is lightly pressed against the face 801 of the lever 80 which swings away therefrom and allows the first letter to come into contact with the belt 30. This causes this letter to move forward along the belt. The motion of the lever 80, however has actuated the primary separator and moved the emery cloth strip 82 over toward the belt and this retards, by its friction, the motion of the letters and allows them to pass only one at a time. If more than one does pass, the second one is caught against the secondary separator and held until its predecessor goes by. The letters are guided along the conveyer belt 30 until they pass to and upon the second conveyer belt 31 and between the sloping rails 85 of the hopper. The letters are conveyed along the second belt, singly, to the third belt 32. At this place each advancing letter is gripped between the belt 32 and roller 518 and guided into the position shown in Fig. 5. In reaching this position, its rear edge strikes the side of the inclined arm 63 which extends across its path and in front of the stop 89, as already stated. Gliding along the side of the arm 63 and into the notch 90×, the rear portion of the letter, between the closed side of the notch and the roller 518, is bent away from the plane of the belt 32, while its portion forward of the roller is still engaged with the belt. Its rear edge is now in position to engage the stop 89, when its movement is continued, but its motion toward the stop 89 is or may be momentarily stopped by the described relation of the arm 63 and lever 51, which thus are adapted to form elements of a timing mechanism.

At the proper predetermined time, the obstruction to the movement of the letter to the stop 89 is removed by the turning of the cam 41 so as to present its low part to the lever 51. This lever 51, receding from the arm 63, opens the path to the stop 89 and at the same time proportionately forces the roller 518 away from the plane of the belt 32. At this moment, and as the portion of the letter in advance of the roller 518 is still engaged with the belts 32 and 31, or one of the same, and also as the other end of the letter is still held away from the plane of the belt 32 by the arm 63, which has been maintained in the same position which it occupied previous to this movement of the lever 51 and roller 518, the letter will move rearward toward the stop 89, with its intermediate portion on the roller 518. It is thus accurately fed to the stop 89. During this movement of the parts, the cam 40 is also turning to present its low part to the arm 502 of the swinging bearing or lever 50.

At the proper predetermined time in the movement of the marking cylinder 53, the high part of the cam 42 reaches and acts upon the lever 52, forcing the same toward the plane of the belt 32. In this movement of the lever 52 (during or previous to which, as will be understood, the movement of the roller 518 and lever 51 away from the plane of the belt 32 are continued) it, the said lever 52, engages the side of the letter and sweeps the same off the stop 89 and toward the belt 32 and at the same time acts upon the arm 63 and forces the same in such direction that the arm 64 is operated to turn the arm 72 of the restraining or holding device out of the path of the arm 503 of the swinging bearing or lever 50, thus permitting the latter to be turned by its spring 504 so that its arm 502 will follow the cam surface of the cam roller 40, the low part of which, as already stated, is now presented to the latter arm. The impression roller is thus moved to the letter and made effective to press the letter against the marking cylinder, the marking portion of which has now reached its operative position. The parts being now in position to postmark and stamp cancel the letter, the latter is fed between the same and to the dispersing wheel 700, by the belts 31 and 32, with which the letter has been fully reëngaged as aforesaid.

In adjusting the arm 72 of the holding or restraining mechanism away from the arm 503 of the swinging bearing, the arms 72 and 62 move in opposite directions, placing their connecting spring 66 under tension, as has been already stated. Similarly the arm 515 which carries the roller 518 is under tension when the latter is away from the plane of the belt 32.

At the proper predetermined time, as when the letter has been postmarked and stamp canceled and has been fed rearward beyond the marking cylinder and impression roller, the high part of the cam 40 acts on the arm 502 to force the impression roller away from the plane of the belt 32, moving its arm 503 in the same direction. At this time the low part of the cam 42 is presented to the lever 52. The spring 66 is now effective to restore the arm 72 to its holding position with relation to the arm 503 and also to move the arm 63 across the path of the succeeding letter. The high part of the cam 41 is also engaged with the lever 51, thus forcing the same toward the plane of the belt 32 and allowing the arm 515 to move the roller toward said belt. The parts are now again in their aforesaid normal positions ready to act upon the next approaching letter fed thereto in the manner set forth.

The dispersing wheel 700 is or may be of the usual form which is well known in the art and needs no special description.

54 is the inking roller. This roller is suitably supported in bearings upon an arm 55 adapted to swing upon the post 513 and kept in position to act against the sector 531 of the printing cylinder by means of a coiled spring 551 which is secured to a fixed point on the machine.

Between the printing cylinder 53 and the dispersing wheel 700 there is arranged a roller 560 which is mounted on an arm 56 which is fulcrumed upon the shaft 18 and is provided with a spring 561 which holds the roller 560 yieldably in the path of the letter. The purpose of this roller is to assure proper delivery of the postmarked and canceled letter to the dispersing wheel 700.

In all or nearly all post-offices there are portions of the day when the mail is not heavy enough to make it desirable to use a power-driven machine having automatic separating or feeding means, and when the mail can thus be very conveniently postmarked and its stamps canceled by a machine which lacks such automatic separating means and power mechanism. In the same post-offices there are periods of the day when a machine having automatic separating means and driving power is necessary to the prompt handling of the mail. As already implied, one of the leading purposes of the invention is to provide a machine which answers both of the conditions just named. In other words, it is one of the principal aims of my invention to provide a machine for postmarking and stamp canceling mail matter, which will comprise means for driving it automatically and feeding means for automatically separating the letters, and which will also be of such construction as to be adapted to be fed and driven manually, thus economizing in the use of power.

The means for separating the letters and feeding them to the printing mechanism and the power driving means therefor have already been described, and it only remains to set forth a suitable mechanism for driving the same manually. Attention is called to the fact that the utilization of a horizontal belt (31) as the main conveyer, and the location of said belt at the bottom or outlet of a hopper, which extends longitudinally thereof and is formed by the guard rails 85, before mentioned, and its further location approximately in the horizontal plane of the lower edge of an upright belt 30 which forms part of an automatic separating means and serves to feed the letters toward and deliver them to the main conveyer, not only forms a most desirable arrangement of parts for automatic separating operation, but is further well adapted to the feeding of the letters by hand, which latter operation is performed by the deposit of the letters separately by hand between the guard rails 85 and upon the belt 31.

In order that the shaft 18, which, through its connections therewith, operates the several described cams and the belt 31, and the pulley 25 which directly operates the belt 31, may be driven manually, I have provided a gear 91 which is adapted to mesh with the gear 23 in the shaft 24 of said driving pulley 25. Said gear 23 engages the gear 22 on the said shaft 18 and thus transmits movement to the latter. The gear 91 is mounted for adjustment into and out of mesh with gear 23, for which purpose its shaft 910 is provided with a sprocket wheel 912 adapted to be rotated by a sprocket chain 913 which in turn is actuated from the shaft 914 of a driving wheel 915 which is provided with suitable foot pedals 916.

Of course it will be understood that a seat for the operator is provided in a convenient location and that any suitable gear shifting or other means may be provided for throwing the manually operating means out of gear when the automatic power mechanism is being operated.

From the foregoing the construction, operation, and advantages of the machine will be readily comprehended, and it will be understood that while the details illustrated have been described with particularity because they constitute the best means known to me for carrying the invention into effect, it is not to be assumed therefrom that the invention is restricted to said details.

Many changes and many apparently different embodiments of my invention may be made without departing from the real spirit and scope thereof, and all matter contained in the above description or shown in the accompanying drawings is to be interpreted as illustrative and not in a limiting sense.

What I claim as new is:—

1. In a machine of the class described, the combination with marking and conveying mechanism, and a timing mechanism having mail deflecting and stopping elements, of a mail holding and guiding device which is pressed against the mail at a place in advance of the deflecting element, during the period of rest of the mail, and is moved, at the end of said period, to release the mail and permit its travel to be resumed.

2. In a machine of the class described, the combination with marking and conveying mechanism, and a timing mechanism comprising a stop and an arm for deflecting the mail toward the stop, of a mail holding and guiding device, adapted to engage the mail at a place in advance of the deflecting arm, and means whereby said device is pressed against the mail during the period of rest of the latter, and is moved, at the end of said period, to release the mail and permit its travel, along the deflecting arm and to the stop, to be resumed.

3. In a machine of the class described, the combination with marking and conveying mechanism, and a timing mechanism comprising a stop and a deflecting arm, of a mail holding and guiding roller which is pressed against the mail during the period of rest of the mail, and is moved, at the end of said period, to release the mail and permit its travel, along the deflecting arm and to the stop, to be resumed.

4. In a machine of the class described, the combination with marking and conveying mechanism, of timing devices, comprising a mail stopping element, a plurality of elements each movable relatively to the mail path and engaged with the mail at different places in the length thereof and simultaneously pressing the same in opposite directions, the forward one toward the plane of the conveying mechanism and the rearward one toward the mail-stopping element, and means for moving said plurality of elements at predetermined times.

5. In a machine of the class described, the combination with marking and conveying mechanism, of a stop, means for deflecting the mail toward the stop, comprising a roller to act on the mail, and an arm carrying the roller and movable toward and from the path of the mail, the arm being held normally toward the path, and means for pressing the arm away from the path at a predetermined time.

6. In a machine of the class described, the combination with marking and conveying mechanism, of a stop, means for guiding the forward end of the mail away from the plane of the conveying mechanism and toward the stop, said guiding means comprising a roller and a pivotally mounted deflecting lever each adapted to engage the mail, and means for moving the roller and lever toward and from the mail.

7. In a machine of the class described, comprising a conveying means, a marking element and an impression element; a permanent stop interposed in the path of the conveyed mail and in front of the marking element, means for deflecting the mail and moving it positively against the stop, comprising a roller normally pressed against the conveying means, means for maintaining the mail in position against the stop until a predetermined point on the marking element has turned to a point opposite the stop and means for then releasing the mail to move between the impression and marking elements.

8. In a machine of the class described, comprising a conveying means, a marking element and an impression element; a permanent stop interposed in the path of the conveyed mail and in front of the marking element, means for deflecting the mail and moving it positively against the stop, comprising a roller normally pressed against the conveying means, means for maintaining the mail in position against the stop until a predetermined point of the marking element has turned to a point opposite the stop and an arm sweep and its actuating cam for then releasing the mail to move between the impression and marking elements, said cam mounted on the shaft of the marking element.

9. In a machine of the class described, comprising a conveying means, a marking element, an impression element, a permanent stop interposed in the path of the conveyed mail and in front of the marking element, means for moving the mail away from the conveying means, comprising a bell crank lever and an oscillating roller timed to hold the mail between them at that time, means for moving the mail positively against the permanent stop, and a swinging arm adapted to engage with the bearing of the roller for moving the roller away from the mail to allow the latter to move forward when the marking element has turned to a predetermined point.

10. In a machine of the class described, the combination with marking mechanism, and a conveying element, of a stop, and deflecting means comprising a plurality of devices which act upon the mail in opposite directions and are adapted to guide the same from the conveying element and toward the stop, and means for moving said devices toward and from the mail and disengaging the mail from the stop and moving it toward the conveying element, all at predetermined times.

11. In a machine of the class described, the combination with marking mechanism, and a conveying element, of a stop, and deflecting means comprising a plurality of devices which act upon the mail in opposite directions and are adapted to guide the same from the conveying element and toward the stop, one of said devices comprising a roller, and means for moving said devices toward and from the mail, disengaging the mail from the stop and moving it toward the conveying element, all at predetermined times.

12. In a machine of the class described, the combination with marking mechanism and a conveying element, of a stop, and deflecting means comprising a plurality of devices which act upon the mail in opposite directions and are adapted to guide the same from the conveying element and toward the stop, one of said devices comprising a roller, and the other of said devices comprising a lever, and means for moving the devices toward and from the mail, disengaging the mail from the stop and moving it toward the conveying element, all at predetermined times.

13. In a machine of the class described, the combination with relatively movable marking and impression elements, a conveying mechanism, and a stop, of means for guiding the mail comprising an arm and means for moving said arm across the path of the mail, a device movable toward and from said arm and coöperating therewith to restrict the passage leading to the stop, means for moving said device toward and from the mail path, and mechanism for disengaging the mail from the stop and producing a relative movement of the marking and impression elements, all at predetermined times.

14. In a machine of the class described, the combination with relatively movable marking and impression elements, a conveying mechanism, and a stop, of means for guiding the mail comprising a plurality of devices arranged one in advance of the other and adapted to deflect the mail toward the stop, one of said devices being arranged across the path of the mail, means movable toward and from the latter device and coöperating therewith to restrict the passage leading to the stop, and means for advancing the other of said devices toward the conveying mechanism when said passage is restricted.

15. In a machine of the class described, the combination with relatively movable marking and impression elements, a conveying mechanism, and a stop, of means for guiding the mail comprising an arm and means for moving said arm in opposite directions across the path of the mail, a device movable toward and from said arm and coöperating therewith to restrict the passage leading to the stop, means for moving said device toward and from the mail-path, a mail engaging device arranged in advance of said arm and movable toward and from the conveying mechanism, and mechanism for disengaging the mail from the stop and producing a relative movement of the marking and impression elements, all at predetermined times.

16. In a machine of the class described, the combination with mail feeding and marking means, and a stop, of means for guiding the mail toward the stop, comprising a member movable toward and from the mail and adapted to be engaged by the same and a second member also movable toward and from the mail and having connection with the first member and means operating one of said members for moving it and the other member relatively to the path of the mail.

17. In a machine of the class described, the combination with mail feeding and marking means, and a stop, of means for guiding the mail toward the stop, comprising an arm movable toward and from the mail and having a roller to engage the same, a cam, and a pivoted arm movable into the path of the mail and operated by the same and engaging the first mentioned arm and moving the same in one direction.

18. In a machine of the class described, the combination with mail feeding and marking means, of a plurality of arms movable relatively to each other toward and from the path of the mail, and a device movable toward and from the path of the mail and adapted to engage the same in advance of said arms and having connection with one of said arms so as to be operated thereby in one direction.

19. In a machine of the class described, the combination with mail feeding and marking means, and a stop, of means for guiding the mail toward the stop, comprising a plurality of arms movable relatively to each other toward and from the path of the mail, and another arm movable toward and from the mail and provided with a roller to engage the same, the last mentioned arm having connection with and operated in one direction by one of the first mentioned arms.

20. In a machine of the class described, a marking element, means for controlling the admission of mail to the marking element, comprising relatively-movable means coöperating to restrict the passage leading to the marking element, and a device to engage the mail in advance of said means, said device being movable toward and from the mail under the control of one of said relatively-movable means.

21. In a machine of the class described, the combination with mail feeding and marking means, of a timing mechanism, and a device movable toward and from the conveying mechanism for pressing the mail to the latter, said device being connected with and controlled in its movements by an element of the timing mechanism.

22. In a machine of the class described, the combination with mail feeding and marking means, of an arm movable toward and from the mail, said arm having a roller to engage the mail, a cam, a pivoted arm operated by the cam and engaging the first mentioned arm and moving the same in one direction, a lever projecting into the path of the mail from the side opposite the pivoted arm, a cam for moving the lever, and means for operating the cams.

23. In a machine of the class described, the combination with mail feeding and marking means, of a stop, and means for guiding the mail to the stop, comprising a device movable toward and from the path of the mail, a plurality of relatively-movable arms arranged between said device and the stop and movable toward and from the path of the mail, and one of the same having connection with said device and operating the same in one direction and means for moving the latter arm in advance of the other arm.

24. In a machine of the class described, the combination with mail feeding and marking means, of a stop, and means for guiding the mail to the stop, comprising an arm movable toward and from the path of the mail, a roller carried thereby and adapted to engage the mail, and a pair of relatively-movable arms arranged between said roller and the stop and movable toward and from the path of the mail, and one of the same having connection with the first mentioned arm and operating the same in one direction and provided with means for moving it in advance of the other arm of the pair.

25. In a machine of the class described, the combination with mail feeding and marking means, and a stop, of means for guiding the mail to the stop, comprising a device movable toward and from the path of the mail, a plurality of relatively-movable arms arranged between said device and the stop and movable toward and from the path of the mail, one of said arms having connection with said device and moving the same in one direction, means for moving the latter arm, and means for freeing the mail from the stop and moving the other arm out of the path of the mail.

26. In a machine of the class described, the combination with mail feeding and marking means, and a stop; of means for guiding the mail to the stop, comprising a device movable toward and from the path of the mail, a plurality of relatively-movable arms arranged between said device and the stop and adapted to close the mail-passage between the same, one of said arms having connection with said device and moving the same in one direction, means for moving the latter arm in advance of the other arm, and means for freeing the mail from the stop and moving said other arm out of the path of the mail.

27. In a machine of the class described, the combination with marking and conveying mechanisms for the mail, of pivotally mounted levers projecting toward each other and into the path of the mail from opposite sides of said path, and means for moving the levers out of the path of the mail at predetermined places in the movement of the marking mechanism.

28. In a machine of the class described, the combination with mail feeding and marking means, of mail timing mechanism comprising a plurality of movable arms adapted to dependently close the passage leading to the marking means, and mechanism for moving said arms toward each other and across the path of the mail and for moving them away from each other out of such path.

29. In a machine of the class described, the combination with a mail separating means, a mail feeding means and a marking means, of mail timing mechanism arranged between the mail separating and marking means and comprising a plurality of movable arms adapted to dependently close the passage leading to the marking means, and mechanism for moving said arms toward each other and across the path of the mail and for moving them away from each other out of such path.

30. In a machine of the class described, the combination with mail feeding and marking means, of mail timing mechanism, comprising a stop, a plurality of movable arms arranged in advance of the stop and adapted to dependently close the passage leading thereto, and mechanism for moving said arms toward each other and across the path of the mail and for moving them away from each other out of such path.

31. In a machine of the class described, the combination with mail feeding and marking means, of mail timing mechanism, comprising a stop, a plurality of movable arms arranged in advance of the stop and adapted to dependently close the passage leading thereto, mechanism for moving said arms toward each other and across the path of the mail, and for moving them away from each other out of such path, and means for freeing the mail from the stop while the arms are out of mail stopping position.

32. In a machine of the class described, the combination with mail feeding and marking means, of mail timing mechanism, comprising a fixed stop, a plurality of movable arms arranged in advance of the stop and adapted to dependently close the passage leading thereto, mechanism for moving said arms toward each other and across the path of the mail and for moving them away from each other out of such path, an arm for sweeping the mail off from said stop, and means for operating the latter arm while the first mentioned arms are out of operative position.

33. In a machine of the class described, the combination with mail feeding and marking means, of a stop, and means for guiding the mail to the stop, comprising a plurality of relatively-movable arms movable toward and from the path of the mail and means for moving one of said arms out of the path of the mail in advance of the other.

34. In a machine of the class described, the combination with mail feeding and marking means, of a mail timing mechanism comprising a stop, a plurality of relatively movable arms adapted dependently to close the passage leading to the stop, one of said arms adapted to guide the mail to the stop, and means for moving the other of said arms away from the mail guiding arm while the latter is in mail guiding position.

35. In a machine of the class described, the combination with mail feeding and marking means, of a mail timing mechanism comprising a stop, a plurality of arms adapted dependently to close the passage leading to the stop, one of said arms adapted to guide the mail to the stop, and mechanism for moving said arms toward each other to close said passage and for imparting opposite movement to the arms and one in advance of the other, to open said passage.

36. In a machine of the class described, the combination with mail feeding and marking means, of a mail timing mechanism comprising a stop, a plurality of arms adapted dependently to close the passage leading to the stop, one of said arms adapted to guide the mail to the stop, mechanism for moving said arms toward each other to close said passage and for imparting opposite movement to the arms and one in advance of the other, to open said passage, and means for freeing the mail from the stop, all at predetermined times in the movement of the marking means.

37. In a machine of the class described, a marking element and an impression element, one of which is mounted for movement toward and from the other, means tending to move the movable element relatively to the other, and means for restraining such tendency, comprising a stop device for the movable element, a lever adapted to move said device in one direction, and a spring connecting said stop device and lever with each other and adapted to move the former in the other direction.

38. In a machine of the class described, a marking element, an impression element, a movable bearing for one of said elements, means tending to move the latter element toward the other element, and means for restraining such tendency comprising a plurality of levers the first of which is adapted to be moved into and out of the path of the bearing and the other of which is actuated to move the first, and a spring connecting said levers with each other.

39. In a machine of the class described, a marking element, an impression element, a movable bearing for one of said elements, means tending to move the latter element toward the other element and means for restraining such tendency, comprising a lever having a plurality of members one of which is movable into and out of the path of the bearing, an angle lever one of the members of which is connected with a second member of the first lever, and a spring connecting the levers with each other.

40. In a machine of the class described, the combination with mail feeding means, a marking element, an impression element and means tending to move one of said elements toward the other, of means for restraining such tendency comprising a lever having a stop, a second lever operatively connected with the first lever and adapted to move the same in one direction, a spring connecting the levers with each other and adapted to move each of them in one direction and means for moving the second lever in opposition to the spring.

41. In a machine of the class described, a marking cylinder, an impression roll, a swinging bearing for one of said elements, a spring for moving the bearing in one direction, means for restraining such movement, comprising a lever having oppositely projecting arms one of which is adapted to engage the bearing, an angle lever one member of which engages the other of said arms, a spring connecting the levers with each other, and means for operating the bearing and angle lever in opposition to the springs.

42. In a machine of the class described, a marking element, an impression element, a movable bearing for one of said elements, means tending to move the latter element toward the other element, and means for restraining such tendency, comprising a lever having a plurality of members one of which is movable into and out of the path of the bearing, an angle lever one of the members of which is connected with a second member of the first lever, and an operating means engaging the angle lever.

43. In a machine of the class described, a marking element, an impression element, a movable bearing for one of said elements, means tending to move the latter element toward the other element, and means for restraining such tendency, comprising a lever having a plurality of members one of which is movable into and out of the path of the bearing, an angle lever one of the members of which is connected with a second member of the first lever and a second member of which projects into the path of the mail, a spring connecting a third member of the angle lever with the first mentioned lever, and means acting on the second member of the angle lever and forcing the same out of the path of the mail and moving the first mentioned lever and placing the spring under tension.

44. In a machine of the class described, a marking element and an impression element, mounted for relative axial movement, means for conveying the mail singly to a place between said elements, a cam which turns with one of said elements, a swinging arm adapted to be moved by said cam against the mail and a lever adapted to be moved by said arm to allow the other of said elements to contact with the mail.

45. In a machine of the class described, a marking element and an impression element mounted for relative axial movement, means for conveying the mail singly to a place between said elements, a cam which turns with one of said elements, a swinging bearing for the other of said elements, and an arm adapted to be operated by the cam and to move said other element at a predetermined time in the movement of the element with which the cam turns.

46. In a machine of the class described, a marking element, an impression element, means for conveying mail to a place between the marking element and impression element, a swinging bearing for one of said elements, and means for operating the bearing to move its element toward and from the other element, said means having a device for restraining movement of the bearing, a cam and means operated by the cam at a predetermined time in the movement of said other element to remove such restraint.

47. In a machine of the class described, a marking element, and an impression element, mounted for relative axial movement, means for conveying mail singly to a place between said elements, a cam which turns with one of said elements, a swinging bearing for the other of said elements, means for holding said other element against movement toward the companion element, and an arm adapted to contact with the cam to move said other element at a predetermined time in the movement of said companion element.

48. In a machine of the class described, a marking element, and an impression element, mounted for relative axial movement, means for conveying mail singly to a place between said elements, a cam which turns with one of said elements, a swinging bearing for the other of said elements, a two-armed lever, one arm of which is interposed normally in the path of the swinging bearing and adapted to hold the same against movement, and means operated by the cam to move said arm out of such path.

49. In a machine of the class described, a marking element, and an impression element, means for conveying the mail singly to a place between said elements, a cam which turns with one of said elements, a swinging bearing for the other of said elements, a two-armed lever, one arm of which is interposed normally in the path of the swinging bearing and is adapted to hold the same against movement, and a bell crank adapted to press against the second arm of said lever at a predetermined time to move said lever and release the bearing.

50. In a machine of the class described, a marking element and an impression element, a movable bearing for one of said elements and a rotative shaft upon which the other of said elements is mounted, said shaft having a cam, of means tending to move the bearing in one direction and means for restraining such tendency, the latter means comprising a stop movable into the path of the bearing, a movable arm connected with the stop and adapted to move the same, and a lever pivoted to a fixed support and engaging the cam and operated thereby to move the arm.

51. In a machine of the class described, a marking element, an impression element, a movable bearing for one of said elements, means tending to move the latter element in one direction and means for restraining such tendency comprising a lever having a plurality of members one of which is movable into the path of said bearing, an arm pivoted to a fixed support and engaging another member of the lever and adapted to operate the latter and a cam actuated operating lever for said arm.

52. In a machine of the class described, a marking element, an impression element, a movable bearing for one of said elements, a rotative shaft upon which the other of said elements is mounted, said shaft having a cam, means tending to move the bearing in one direction and means for restraining such tendency, the latter means comprising a lever having a plurality of members one of which is movable onto the path of said bearing, an arm pivoted to a fixed support and engaging another member of said lever, and an operating lever for said arm, pivoted to a fixed support and operated by said cam.

53. In a machine of the class described, a marking element, an impression element, means for conveying the mail singly to a place between said marking and impression elements, a swinging bearing for one of said elements, a spring adapted normally to move the bearing toward the other of said elements, a stop normally interposed in the path of said bearing to prevent such movement and cam actuated means for removing the stop at a predetermined point in the rotation of the printing cylinder.

54. In a machine of the class described, a marking element, an impression element, means for conveying mail singly to a place between said elements, a swinging bearing for one of said elements, a spring adapted normally to move the bearing toward the other of said elements, a stop normally interposed in the path of said bearing to prevent such movement, and means for removing the stop at a predetermined point in the rotation of said other element, having a lever adapted to engage with said stop and a cam for moving the conveyed mail against said lever to swing it.

55. In a machine of the class described, a marking element and an impression element, mounted for relative axial movement, means for conveying mail singly to a place between said elements, a swinging bearing for one of said elements, a spring adapted normally to move the bearing toward the other of said elements, a stop device normally interposed in the path of said bearing to prevent such movement, and means for removing the stop at a predetermined point in the rotation of said other element, having a cam on the shaft of said other element, a swinging arm moved thereby against the conveyed mail and a lever adapted to be moved by the pressure of the mail, said lever being provided with a member adapted to move the stop device.

56. In a machine of the class described, a marking element, an impression element, a swinging bearing for one of said elements, a spring for moving the bearing in one direction, means for restraining such movement, comprising a lever having oppositely projecting arms one of which is adapted to engage the bearing, an angle lever one member of which engages the other one of said arms, a spring connecting the levers with each other, and means for operating the bearing and angle lever in opposition to the springs, which means comprise a plurality of pivoted arms, one of which engages the bearing and the other the lever, and cam mechanism acting on the arms.

57. In a machine of the class described, the combination with a mail conveyer, a marking element, an impression element, a spring pressed swinging bearing for one of said elements, and a stop to engage the bearing, of pivotally mounted levers movable toward and from each other and into and out of the path of the mail and from opposite sides of said path, one of said levers having a connection with the stop and adapted to move the same, and means for moving the levers.

58. In a machine of the class described, a marking element, an impression element, a movable bearing for one of said elements, means tending to move the latter element in one direction and means for restraining such tendency comprising a lever having a plurality of members one of which is movable into the path of said bearing, a second lever, having an arm engaging another member of the first lever and adapted to operate the latter and also having another arm projecting into the path of the mail and adapted to deflect the same, and operating means for the second lever engaging the last mentioned arm thereof.

59. In a machine of the class described, a conveying means, a marking element, an impression element, a movable bearing for one of said elements, means tending to move the latter element in one direction, means for restraining such tendency comprising a lever having a plurality of members one of which is movable into the path of the bearing, a stop, means for operating said lever and guiding the mail toward the stop, comprising a second lever having an arm engaging another member of the first lever and a second arm which is arranged across the path of the mail and projects toward the stop, and mechanism for moving the last mentioned lever and freeing the mail from the stop.

60. In a machine of the class described, a stop for the mail, a marking element, an impression element, a movable bearing for one of said elements, means tending to move the latter element toward the other, means for restraining such tendency comprising a lever having a plurality of members one of which is movable into the path of the bearing, and means for actuating said lever and guiding the mail toward the stop, comprising a three-arm lever, one arm of which engages an arm of the first lever, and another arm of which projects into the path of the mail and toward the stop, a spring connecting the third arm of the last lever with the first lever, and a cam-operated lever which sweeps the mail off the stop and moves the levers in opposition to the spring.

61. In a machine of the class described, a marking element, an impression element, a swinging bearing for one of said elements, a spring for moving the bearing in one direction, means for restraining such movement, comprising a lever having projecting arms one of which is adapted to engage the bearing, an angle lever one member of which engages the other of said arms, a spring connecting the levers with each other, and means for operating the bearing and angle lever in opposition to the springs, which means comprise a plurality of pivoted arms, one of which engages the bearing and the other the lever, and cam mechanism acting on the arms, one member of the angle lever and the last mentioned arms projecting into the path of the mail from opposite sides of the path.

62. In a machine of the class described, a marking element, an impression element, a swinging bearing for one of said elements, a spring for moving the bearing in one direction, means for restraining such movement, comprising a lever having projecting arms one of which is adapted to engage the bearing, an angle lever one member of which engages the other of said arms, a spring connecting the levers with each other, and means for operating the bearing and angle lever in opposition to the springs, which means comprise a plurality of pivoted arms, one of which engages the bearing and the other said lever, and cam mechanism acting on the arms, the angle lever and the last mentioned arms projecting into the path of the mail from opposite sides thereof and adapted temporarily to stop the progress of the mail, a stop contiguous to the arms and angle lever, and a cam operated arm adapted to release the mail from its engagement with the stop.

63. In a machine of the class described, the combination with relatively movable marking and impression elements; means tending to press one of the same toward the other, and a conveying element, of means for restraining such tendency, comprising an arm adapted to deflect the mail from the conveying element, a device arranged in advance of said arm for holding the mail toward the conveying element during the operation of the arm on the mail, a stop arranged in the path of the deflected mail, and instrumentalities for disengaging the mail from the stop and pressing it back to the conveying element and for removing the arm out of the path of the mail and causing it to remove restraint to the relative movement of the impression and marking elements.

64. In a machine of the class described, the combination with relatively movable marking and impression elements, means tending to press one of the same toward the other, and a conveying element, of means for restraining such tendency, comprising an arm adapted to deflect the mail from the conveying element, a roller arranged in advance of said arm for holding the mail toward the conveying element during the operation of the arm on the mail, a stop arranged in the path of the deflected mail, and instrumentalities for disengaging the mail from the stop and pressing it back to the conveying element, and for removing the arm and roller out of the path of the mail and causing the arm to remove restraint to the relative movement of the marking and impression elements.

65. In a machine of the class described, the combination with mail feeding means, a marking element, and an impression element, of an arm having a roller to engage the mail, a pivoted arm adapted to move the same relatively to the mail-path, means for moving the pivoted arm, a swinging bearing for one of said elements, means tending to move the bearing in one direction, a device movable into engagement with said bearing to hold the same against such movement, and mechanism for moving the bearing in the opposite direction and for moving said device into and out of engagement with the bearing.

66. In a machine of the class described, the combination with feeding means, and marking and impression elements, of a pivoted lever carrying one of said elements and having a series of arms, a spring engaging one of said arms and tending to move the lever in one direction, means engaging another of said arms and restraining such movement and a cam for operating on another of said arms to move the lever in opposition to the spring.

67. A machine of the class described, comprising a marking mechanism, a conveying mechanism having three belts, one of which is upright and arranged adjacent to the marking mechanism, another of which is horizontal and feeds the mail to the first mentioned belt and the third of which is adapted to feed the mail to the horizontal belt and has its lower edge approximately in the plane of the receiving portion thereof, and means coöperating with the third belt for separating the mail automatically.

68. A machine of the class described, comprising a marking mechanism, a conveying mechanism having three belts, one of which is upright and arranged adjacent to the marking mechanism, another of which is horizontal and feeds the mail to the first mentioned belt and the third of which is adapted to feed the mail to the horizontal belt and has its lower edge approximately in the plane of the receiving portion thereof, and means co-operating with the said belt for separating the mail automatically, a hopper above the horizontal belt, whereby the mail may be fed normally or automatically to the horizontal belt, and means for driving said belts.

In testimony whereof I affix my signature in presence of two witnesses.

MARTIN V. B. ETHRIDGE.

Witnesses:
 HERMAN MEYER,
 ALAN McDONNELL.